United States Patent
Lin et al.

(10) Patent No.: US 7,151,745 B2
(45) Date of Patent: Dec. 19, 2006

(54) SCALABLE SYNCHRONOUS PACKET TRANSMIT SCHEDULER

(75) Inventors: John Lin, Downey, CA (US); Paris Chen, Walnut, CA (US)

(73) Assignee: Broadcom Corporation, Irvine, CA (US)

( * ) Notice: Subject to any disclaimer, the term of this patent is extended or adjusted under 35 U.S.C. 154(b) by 984 days.

(21) Appl. No.: 10/008,873

(22) Filed: Nov. 8, 2001

(65) Prior Publication Data

US 2003/0086439 A1    May 8, 2003

(51) Int. Cl.
*H04J 1/16* (2006.01)
*H04J 3/14* (2006.01)

(52) U.S. Cl. ...................... 370/230; 370/235
(58) Field of Classification Search ........... 370/468, 370/477, 465, 229, 230, 230.1, 232, 233, 370/234, 235, 236, 237, 242, 444, 277, 91, 370/470, 472, 338, 329, 341, 349, 466, 389, 370/255, 508, 310, 413; 375/200, 202, 134, 375/219, 220, 133, 135, 136, 222, 260; 455/12.1, 455/13.2, 426.1, 426.2, 24, 524, 525, 73, 455/78, 3.01; 711/100, 168; 709/222, 225, 709/226, 203, 223, 224, 217
See application file for complete search history.

(56) References Cited

U.S. PATENT DOCUMENTS

| | | | | |
|---|---|---|---|---|
| 5,287,541 A | * | 2/1994 | Davis et al. | 455/427 |
| 5,687,114 A | * | 11/1997 | Khan | 365/185.03 |
| 5,740,028 A | * | 4/1998 | Sugiyama et al. | 725/149 |
| 5,996,029 A | * | 11/1999 | Sugiyama et al. | 710/15 |
| 6,321,266 B1 | * | 11/2001 | Yokomizo et al. | 709/226 |
| 6,473,818 B1 | * | 10/2002 | Niu et al. | 711/168 |
| 6,590,928 B1 | * | 7/2003 | Haartsen | 375/134 |
| 2002/0027886 A1 | * | 3/2002 | Fischer et al. | 370/255 |
| 2002/0101778 A1 | * | 8/2002 | Khan | 365/230.03 |
| 2002/0163932 A1 | * | 11/2002 | Fischer et al. | 370/465 |
| 2002/0167961 A1 | * | 11/2002 | Haartsen | 370/444 |
| 2003/0137992 A1 | * | 7/2003 | Sharper et al. | 370/468 |

* cited by examiner

*Primary Examiner*—Ricky Q. Ngo
*Assistant Examiner*—Jamal A. Fox
(74) *Attorney, Agent, or Firm*—Garlick Harrison & Markison; Bruce Garlick; Kevin L. Smith

(57) ABSTRACT

A baseband controller system creates and maintains a schedule of synchronized events and reviews the schedule as a part of determining whether to initiate a transmission of a non-synchronous event. One aspect is to avoid a possibility of collision between synchronized and non-synchronized communication events. The schedule of synchronized events are evaluated in relation to the present time and determine whether a non-synchronized event may be transmitted without the likelihood of a collision. The transmission determination includes evaluating future time periods to see if a synchronized event is scheduled during a time period in which the non-synchronized event would continue to be transmitted for those non-synchronized events that span two or more defined time periods in length.

16 Claims, 9 Drawing Sheets

SCALABLE SYNCHRONOUS PACKET TRANSMIT SCHEDULER

BACKGROUND

1. Technical Field

The present invention relates to wireless communication systems and, more specifically, to wireless communication baseband controllers for systems utilizing master to multi-slave communications.

2. Related Art

The Bluetooth wireless technology allows users to make effortless, wireless and instant connections between various communication devices such as notebook computers, desktop computers and mobile phones. Because Bluetooth systems use radio frequency transmissions to transfer both voice and data, the transmissions occur in real-time. The Bluetooth specification provides for a sophisticated transmission mode that ensures protection from interference and provides security of the communication signals.

According to most designs that implement the Bluetooth specifications, the Bluetooth radio is being built into a small microchip and is designed to operate in frequency bands that are globally available. This ensures communication compatibility on a worldwide basis. Additionally, the Bluetooth specification defines two power levels. A first power level covers the shorter, personal area within a room and a second power level is designed for covering a medium range. For example, the second power level might be used to cover communications from one end of a building, such as a house, to the other. Software controls and identity coding are built into each microchip to ensure that only those units preset by the owners can communicate with each other.

More specifically, the Bluetooth wireless technology supports point-to-point and point-to-multipoint connections. Under the Bluetooth specifications, one master can communicate with up to seven slave devices. At any one instant, a Bluetooth master can communicate or transmit over three channels to the slaves under current specifications and designs. Additionally, one group of Bluetooth devices, namely a master and a plurality of slaves, may also communicate with another group to create communication networks of continually configurable and flexible configurations. The topology is best described as a flexible and extendible micronetwork.

The Bluetooth specification is made to facilitate compatibility among systems made by different vendors and sold and utilized throughout the world. At the same time, the Bluetooth protocols and specifications are open to enable the use of proprietary processes underneath the defined communication protocols. The Bluetooth protocol stack can be divided into four layers, notwithstanding that it allows for proprietary implementation, according to the purposes and aspects of the protocol. For example, the core Bluetooth protocol defines the protocols for baseband operation, as well as the link manager protocol (LMP), logical link and control adaptation protocol (L2CAP), and service discovery protocol (SDP).

The second protocol layer is the cable replacement protocol that includes the serial cable emulation protocol (RSCOMM). The third protocol layer is the telephony control protocols which includes the telephony control specification (TCS binary) and the AT commands. Finally, the fourth protocol layer includes the adopted protocols, such as point-to-point protocol (PPP), transport control protocol/user datagram protocol (TCP/UDP), object exchange protocol (OEP), wireless application protocol (WAP), WAP application environment (WAE) and others. In addition to the above mentioned protocol layers, the Bluetooth specification also defines a host controller interface (HCI). HCI provides a command interface to the baseband controller, link manager, as well as access to hardware status and control registers.

The Bluetooth core protocols include Bluetooth-specific protocols that have been developed for Bluetooth systems. For example, the RFCOMM and TCS binary protocol have also been developed for Bluetooth but they are based on the ETSI TS 07.10 and the ITU-T recommendations Q.931 standards, respectively. Most Bluetooth devices require the Bluetooth core protocols, in addition to the Bluetooth radio, while the remaining protocols are only implemented when necessary.

The cable replacement layer, the telephone control layer and the adopted protocol layer form application-oriented protocols that enable applications to run on top of or over the Bluetooth core protocols. Because the Bluetooth specification is open, these additional protocols may be accommodated in an inoperable fashion that is not necessarily required.

The baseband and link control layers facilitate the physical operation of the Bluetooth transceiver and, more specifically, the physical RF link between Bluetooth units forming a network. As the Bluetooth standards provide for frequency-hopping in a spread spectrum environment in which packets are transmitted in continuously changing defined time slots on defined frequencies, the basesband and link control layer utilizes inquiry and paging procedures to synchronize the transmission of communication signals at the specified frequency and clock cycles between the various Bluetooth devices.

The Bluetooth core protocols further provide two different types of physical links with corresponding baseband packets. A synchronous connection-oriented (SCO) and an asynchronous connectionless (ACL) physical link may be implemented in a multiplexed manner on the same RF link. ACL packets are used for data only while the SCO packets may contain audio, as well as a combination of audio and data. All audio and data packets can be provided with different levels of error correction and may also be encrypted if required. Special data types, including those for link management and control messages, are transmitted on a special specified channel.

The Bluetooth protocols are intended for rapidly developing applications using Bluetooth technology. These applications include an ultimate headset, three-in-one phone, local network access, file transfer and Internet bridge. Because of the different types of applications that are envisioned for Bluetooth systems, several aspects of the communication protocols are very important. One requirement for a Bluetooth device is to be able to communicate and transfer its signals in a real-time basis. Another requirement that is extremely important for a Bluetooth system is that it be able to transmit and receive and interpret transmissions at exact moments in time. In the context of a Bluetooth network that includes one master and seven slaves, the synchronization and timing requirements for the communications can be significant for any one device. Current micro-sequencers and controllers, for example, do not have the capability to communicate with up to seven slaves on a real-time basis because it is impossible for any one micro-controller to satisfy the real-time Bluetooth requirements. For example, the internal data pipelines and supporting hardware to facilitate such communications do not readily support this requirement that is found in the Bluetooth specification. Stated differently, the data pipeline designs of masters and micro-controllers cannot readily process all of the data for seven slaves on a real-time basis.

As mentioned above, a give master is physically limited to a number of simultaneous transmission events due to its design. In a master to multi-slave network environment, this limitation can result in conflicts (collisions) between synchronized and non-synchronized events. A synchronized transmissions event is a scheduled transmission that should be made to avoid a degradation of a reconstructed signal quality at the received end. A non-synchronized transmission event is the transmission of data or other signals that are not time sensitive and will degrade based upon when transmitted.

If a non-synchronized transmission event that spans multiple defined transmission periods is initiated, therefore, and if a synchronized event is to occur during the transmission of the multiple period length non-synchronized transmission event, a "collision" could occur. A collision is a term reflecting a situation in which there are not enough resources to satisfy all pending transmissions of synchronized events. Thus, the inventor herein has recognized a need for an efficient method and apparatus for scheduling synchronized events so that non-synchronized events may be initiated without causing a potential collision.

SUMMARY OF THE INVENTION

A baseband controller system creates and maintains a schedule of synchronized events and reviews the schedule as a part of determining whether to initiate a transmission of a non-synchronous event (one that is not time sensitive, e.g., e-mail). One aspect of the present invention is to create a system and method that avoids a possibility of collision between synchronized and non-synchronized communication events. A synchronized event is a scheduled transmission of time sensitive data such as what is often known as continuous bit rate data. Examples include video and voice wherein a collision (inability to transmit the continuous bit rate data) may result in degradation of signal quality at the receiving end. The inventive system and method evaluate the schedule of synchronized events in relation to the present time and determine whether a non-synchronized event may be transmitted without the likelihood of a collision. Making the determination that such a transmission may occur includes evaluating future time periods to see if a synchronized event is scheduled during a time period in which the non-synchronized event would continue to be transmitted for those non-synchronized events that span two or more defined time periods in length.

There exist several manners in which a determination may be made as to whether a synchronized event is presently scheduled. One method involves examining memory in a plurality of locations, one for each pending transmission to determine whether any of the pending transmissions is a synchronized event. Another approach disclosed herein includes generating a table that tracks when synchronized events are to occur. Thus, at the beginning of each time period, the invention includes examining a bit of the table that corresponds to the present time to determine if a synchronized event is presently scheduled. As another aspect of the present invention, the table is also examined to determine if a multi-period non-synchronous event may be initiated without possibly causing a collision with a future synchronized event. If the number of specified time periods of the next synchronized event is less than or equal to the length of the non-synchronized event that is to be initiated, its transmission initiation is delayed until there exist a sufficient number of time periods that allow for the transmission of the non-synchronous event without the possibility of a collision.

In order to achieve the above described aspects, several steps are taken by the inventive system and in the inventive method. A first step includes evaluating the present time to determine what bit of the synchronized event table reflects the present time. This step includes, in one embodiment, dividing the present time value by a specified modulo number and evaluating the remainder. The remainder may be used to determine the bit that reflects the present time. Once the what bit reflects the present time, the invention includes evaluating subsequent bits in the table in relation to the size of any given non-synchronized event to determine whether in initiate transmission of the non-synchronized event.

Other aspects of the present invention will become apparent with further reference to the drawings and specification, which follow.

BRIEF DESCRIPTION OF THE DRAWINGS

These and other features, aspects and advantages of the present invention will be more fully understood when considered with respect to the following detailed description, appended claims and accompanying drawings wherein:

FIG. 6 is a functional block diagram illustrating a plurality of memory structures formed according to one embodiment of the present invention;

DETAILED DESCRIPTION OF THE DRAWINGS

Figure 1:
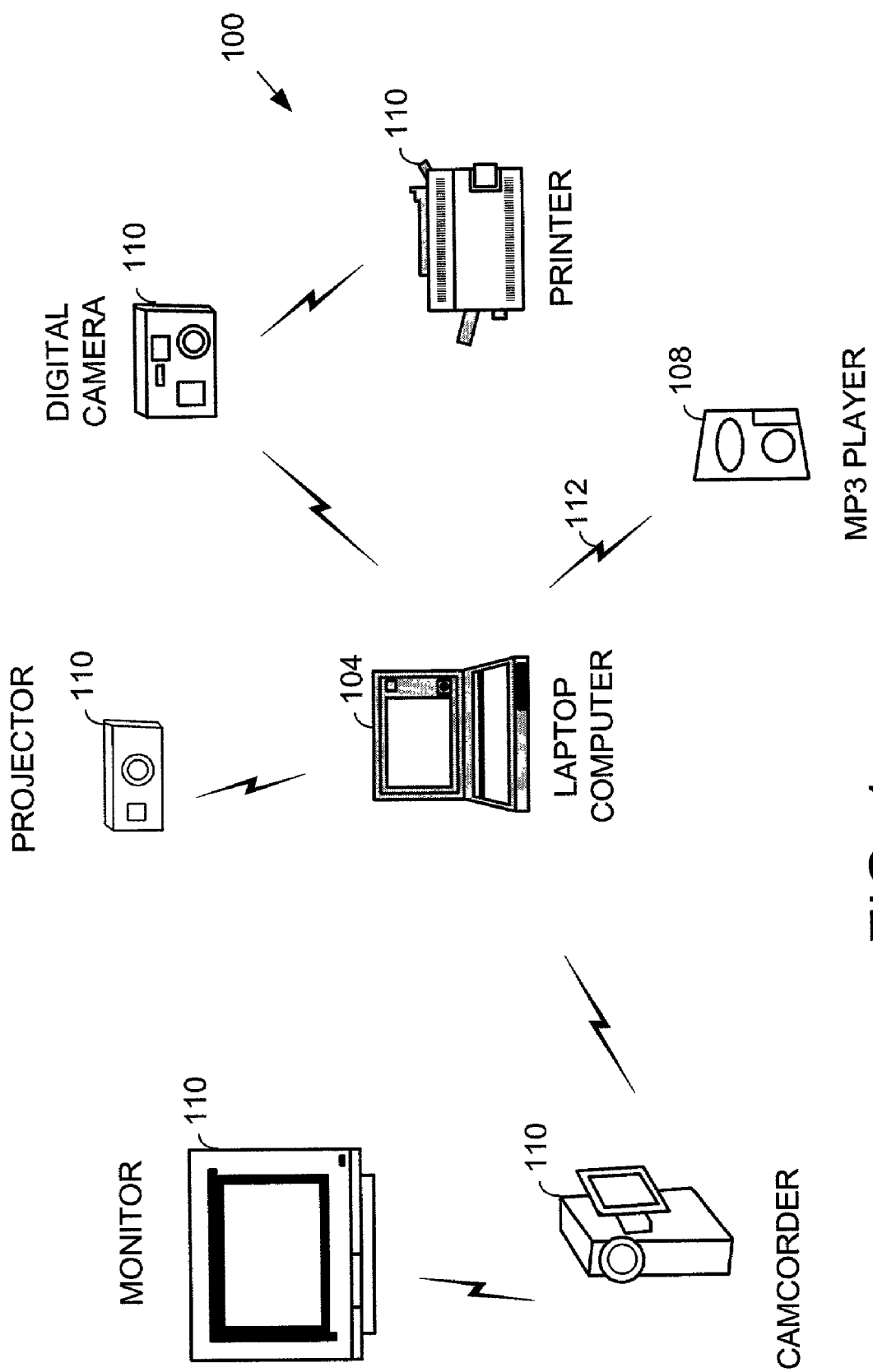
FIG. 1 is a system diagram illustrating a number of Wireless Personal Area Network (WPAN) electronic devices that wirelessly communicate according to the present invention.

FIG. 1 is a functional block diagram of a Bluetooth micro network formed according to one embodiment of the present invention. As may be seen, a Bluetooth master 104 communicates with a plurality of slaves 108 and 110. More specifically, master 104 communicates with slave 108 over communication link 112. Each of the previously mentioned communication layer exchanges may occur between master 104 and the slaves 108 and 110 at any time. Additionally, any one of the slave devices, such as slave 108, may execute each of the aforementioned applications. For example, one slave might be a camcorder, a computer monitor, an MP3 player, a speaker or set of speakers, a printer, a projector or a wireless modem (not shown here in FIG. 1). As may be seen, one Bluetooth network is able to not only transmit audio signals for speakers to play for entertainment purposes, but also to transmit data signals to a specified communication device to enable the user to "surf" the web while listening to his/her favorite music.

Figure 2:
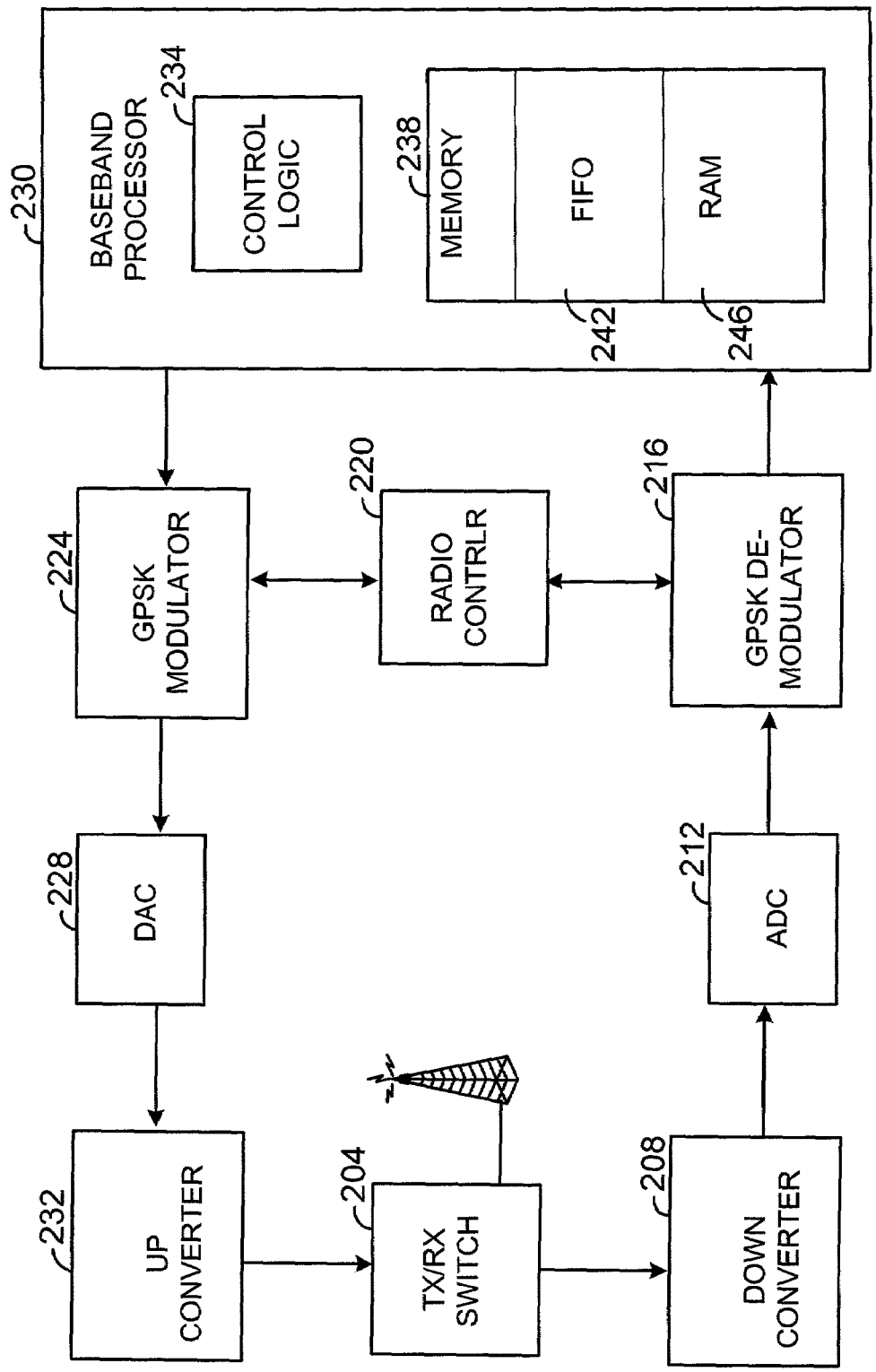
FIG. 2 is a functional block diagram of a Bluetooth radio modem formed according to one embodiment of the present invention.

FIG. 2 is a functional block diagram of a Bluetooth radio modem formed according to one embodiment of the present invention. Referring to the Bluetooth radio modem 200, the radio modem includes a transmit/receive switch 204 that is coupled to an antennae for transmitting and receiving radio frequency signals. For radio frequency signals that are received, the transmit/receive switch 204 is coupled to a down converter 208 that converts the received radio frequency signals to baseband frequency signals. In one embodiment of the present invention, down converter 208 converts directly from RF to baseband, while in another embodiment of the invention, the down conversion occurs through an intermediate frequency step. The down converted radio signals are then produced to an analog-to-digital converter 212 that converts the analog baseband signal to digital. The converter digital signal is then produced to a demodulator 216 which, in the described embodiment of the invention, is a GPSK demodulator. Any type of known modulation scheme may be used, however. The GPSK demodulator 216 then produces the demodulated digital signal to baseband processing circuitry for processing. The GPSK demodulator 216 further is coupled to a radio controller 220 that controls the demodulation signals. Radio controller 220 further is coupled to a GPSK modulator 224 that modulates signals that are to be transmitted, which signals are received from a baseband processor. The modulated signals are then produced by GPSK modulator 224 to a digital-to-analog converter 228 that, in turn, produces converted analog signals at a baseband frequency to up converter 232 that, in turn, converts the signal back to RF for transmission. Thus, up converter 232 produces its output to transmit/received switch 204 that then transmits the signal from its antennae coupled thereto.

The present invention is part of the baseband processing circuitry that receives the demodulated signal from GPSK demodulator 216 and that produces baseband signals to GPSK modulator 224 for processing and transmission. Thus, one aspect of the present invention relates to the order of data that is to be produced to GPSK modulator 224.

(FIX LATER) Baseband processing circuitry 230, as may be seen, includes a control logic module 234, as well as memory shown generally at 238. The memory shown generally at 238 includes a first in, first out memory structure 242 and a random access memory structure 246. According to the present embodiment of the invention, FIFO memory structure 242 is for controlling and providing access to actual data blocks that are stored within random access memory portion 246 in a manner that causes the data blocks to be transmitted in a first in, first out basis without requiring the data to actually be stored within the FIFO memory structure 242.

Figure 3:
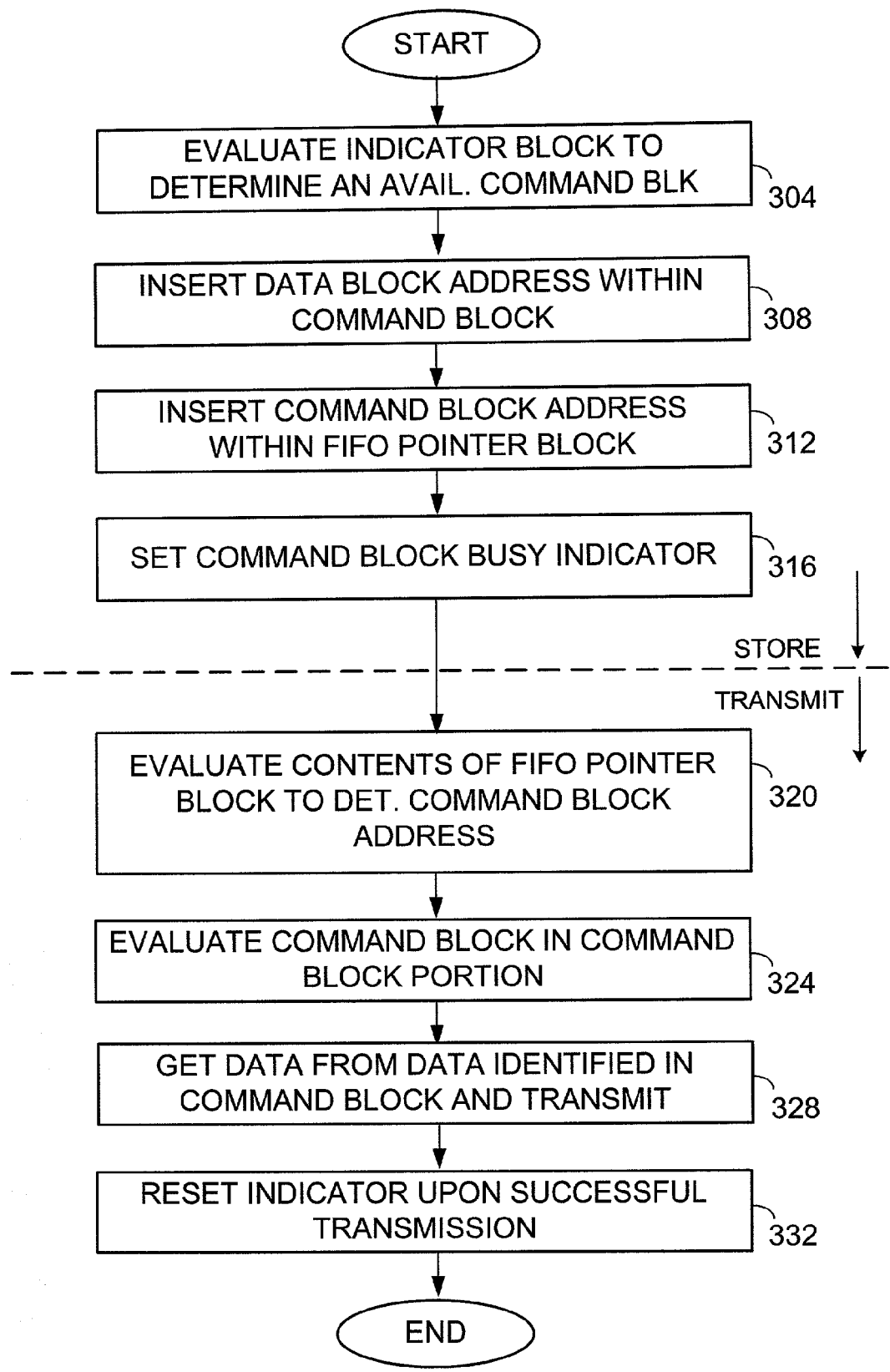
FIG. 3 is a flowchart illustrating a method for storing and accessing data that is to be transmitted through a radio modem according to one embodiment of the present invention.

FIG. 3 is a flowchart illustrating a method for storing and accessing data that is to be transmitted through a radio modem according to one embodiment of the present invention. Initially, the invention includes evaluating an indicator block to determine whether a command block is available for storing an address to a data block that is to be transmitted (step 304). In general, step 304 includes evaluating more than one indicator blocks, if necessary, until an available command block is found. Once an available command block is found, a data block address is stored within the command block (step 308). Thereafter, the command block which received the data block address, which is identified by a command block address, has its command block address stored in a FIFO pointer block (step 312). The FIFO pointer block is a portion of a FIFO memory structure that is used for storing addresses of command blocks that, in turn, store addresses of data blocks. Once a data block address has been stored within a command block, a command block indicator is set to indicate that the command block is in use (step 316).

The foregoing steps describe a process for finding an available command block for identifying an address of a data block that is to be transmitted. The following part of the inventive process relates to transmitting the previously stored data. When a transmission for a given FIFO data block is to occur, the invention includes evaluating the contents of a FIFO pointer block within a FIFO structure to determine a command block address for the next data block that is to be transmitted (step 320). The process then involves evaluating a data block address that is stored within the command block in a command block portion as identified by the FIFO pointer block (step 324). At this point, the actual address in random access memory of the data has been identified and thus the process includes obtaining the data and transmitting it (step 328). Finally, upon determining that the data was successfully transmitted in step 328, the invention includes resetting the command block indicator so that the command block may be used to specify the address of a new data block that is to be transmitted.

As may be seen from the present method, the inventive method is advantageous in that, when coupled with the described structures herein, it facilitates a FIFO architecture in a master-multi-slave environment in which the size of the FIFO structure is minimized because the FIFO structure is used to contain pointer addresses rather than actual blocks of data. The pointer addresses then point to a command block that actually points to the data itself. Also, while not specifically stated in the above process, it is understood that the step of getting the data and transmitting includes evaluating an initial portion of the data block, as specified by the data block address, to determine the size of the data block that is to be transmitted. Accordingly, the system that is transmitting the data is able to know how much data is to be transmitted and to allocate corresponding resources thereto.

Figure 4:
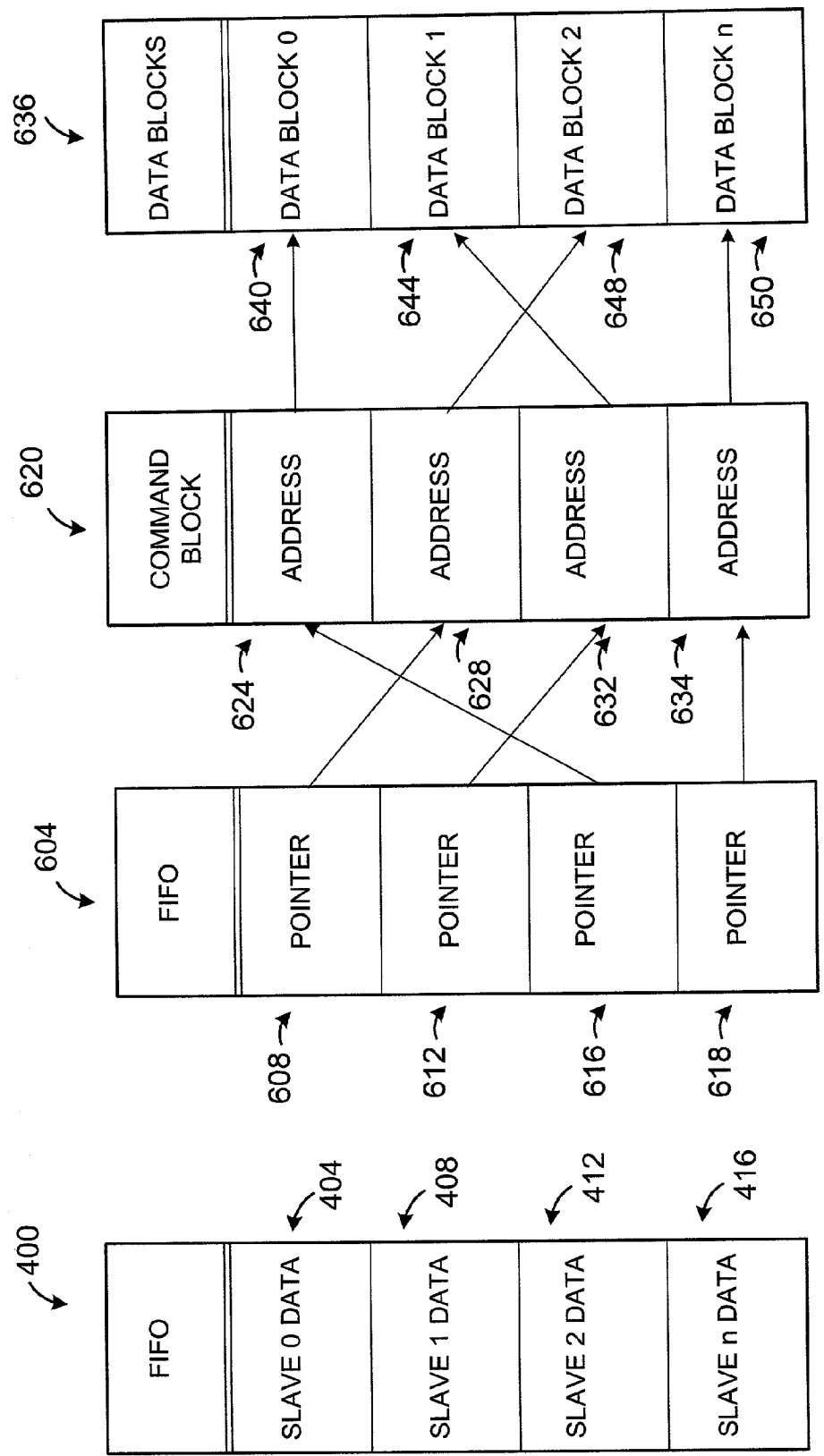
FIG. 4 is a functional block diagram illustrating a traditional prior art FIFO memory structure.

FIG. 4 is a functional block diagram illustrating a traditional prior art FIFO memory structure. As may be seen, a FIFO memory structure 400, in the example shown, defines five memory allocations for saving data that is intended for any one of a plurality of slave devices. More specifically, memory portion 404 is allocated to storing data for slave #1, while memory portion 408 is for storing data for slave #2, while memory portion 412 is for storing data for slave #4, memory portion 416 is for storing data for slave #3, and memory portion 420 is for storing data for slave "n".

Assuming, for the sake of this example, that the data comes off the upper end of the FIFO memory structure 400, slave #2 data cannot be transmitted until slave #1 data has been transmitted successfully. Accordingly, an error encountered due to interference or other transmission problem during the transmission of the slave #1 data stored in memory portion 404, would result in a delay being experienced in the transmission of each of the other data blocks stored and shown in FIG. 4.

Additionally, a negative aspect of the FIFO memory structure 400 is that such a structure is large compared to most FIFO structures in a master-to-multi-slave asynchronous transmission environment. Because each of the slave devices could potentially require the storage of significant sized blocks of data, the FIFO structure must be made large in order to be sufficiently robust and able to meet transmission requirements.

While FIG. 4 illustrates a FIFO structure that is contiguous for all of the slaves in a master-multislave network configuration, there are other topologies that are possible. For example, some possible designs include forming a plurality of FIFO memory structures, one for each potential slave. While this design helps solve the problem of transmission errors to one slave affecting the transmission to other slaves, such a design still is inefficient and expensive. This approach requires that each FIFO structure be built to accommodate all of the data that might be required to be transmitted. Accordingly, this structure requires the creation and reservation of resources for an extreme situation that may rarely come to pass. Most of the FIFO structures would frequently be utilized at a low percentage of their capacities because they are designed to capture the extreme circumstances.

Figure 5:
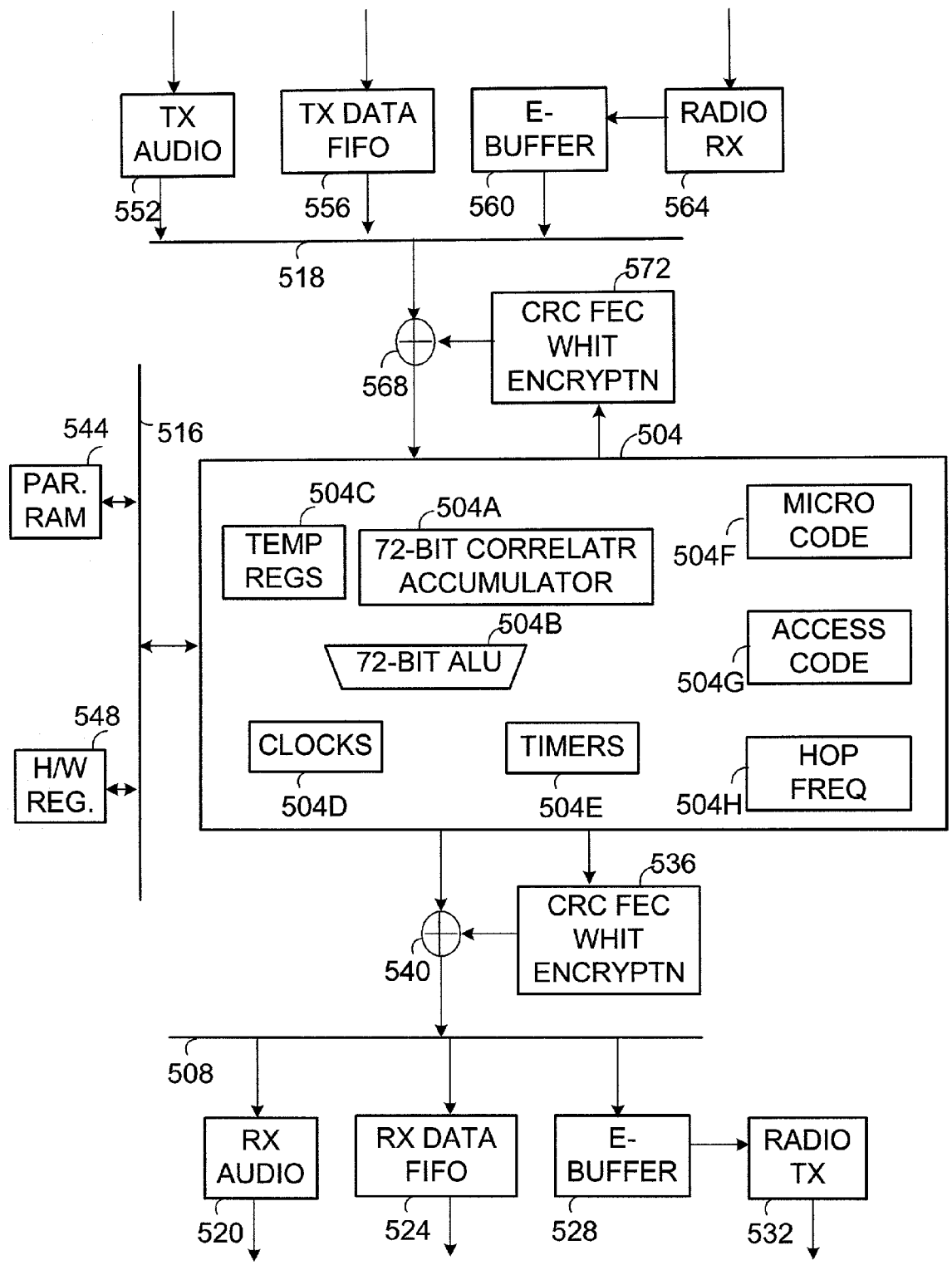
FIG. 5 is a functional schematic block diagram of a microsequencer configured as a real-time Bluetooth baseband controller.

FIG. 5 is a functional schematic block diagram of a microsequencer configured as a real-time Bluetooth baseband controller. A microsequencer circuit 500 in which the microsequencer is configured as a real-time Bluetooth baseband controller includes a microsequencer 504 that is coupled to a plurality of devices. More specifically, as may be seen, microsequencer 504 is coupled to a plurality of buses 508, 518 and 516 that enables it to communicate with registers, memory and other circuitry. For example, bus 508 is coupled to RX audio circuitry 520, RX data FIFO 524 and E-Buffer 528. E-Buffer 528 further is coupled to radio TX block 532. RX audio circuitry 520, RX data FIFO 524 are for receiving received audio processed by the microsequencer. E-Buffer 528 and radio TX 532 are for transmitting radio signals.

The microsequencer 504 of FIG. 5 includes a 72-bit correlator/accumulator 504A, a 72-bit arithmetic logic unit 504B and temporary registers 504C in the diagram shown herein. Microsequencer 504 further includes clock circuitry 504D and timer circuitry 504E for providing timing control functionality to facilitate satisfaction of Bluetooth requirements. The functionality of the clocks and timers are, in the described embodiment of the invention, similar to that which has been described elsewhere herein. Microsequencer 504 further includes microcode block 504F that is for storing microcode (operational computer instructions), access code block 504G that is for storing sync codes and hop frequency block 504H that is for storing frequency information.

Microsequencer 504 also is coupled to CRC FEC Whiten encryption modules 536 and 572 that are for providing CRC error detection, error correction and "whitening" of a given stream of digital signals. The outputs of modules 536 and 572 are coupled to logic gates (exclusive OR in the described embodiment) which combines their outputs with data being output from or input to microsequencer 504.

Parameter RAM block 544 and hardware registers block 548 are coupled to bus 516 to enable microsequencer 504 to transmit and receive data and commands therefrom. Parameter RAM block 544 is random access memory for providing temporary storage of data. Hardware registers block 548 comprises a plurality of accessible registers that are also used for storing data and/or computer instructions.

Similarly, TX audio block 552, TX data FIFO 556 and E-Buffer block 560 also are coupled to bus 518 to communicate with microsequencer 504. E-Buffer 560 further is coupled to receive radio transmissions from radio RX block 564. Bus 518 is coupled to produce communication signals to logic gate 568 that is also coupled to receive bits from CRC FEC Whiten encryption block 572.

In operation, a signal stream that is to be transmitted is received from external radio circuitry (not shown) at TX audio block 552 or TX data FIFO block 556. The signal is conducted along bus 518, through logic gate 568 to microsequencer 504. Microsequencer 504, in turn, processes the signal and outputs it to logic gate 540 where it is logically combined with the outputs of CRC FEC Whitten Encryption module 536. The output of the logic gate 540 is then produced to bus 508 which conducts the signal to E-Buffer 528 and radio TX block 532 for transmission.

Received transmission signals are processed in a similar manner. A received signal is conducted into radio RX block 564 for initial processing and then into E-Buffer 560. E-Buffer 560 produces the signal to logic gate 568 by way of bus 518 where it is logically combined with the output of CRC FEC Whitten Encryption module 572 that decodes the signal (among other functions). The received signal is then conducted through microsequencer 504 which then processes it and produces it to either RX audio block 520 or RX data FIFO block 524 for further audio processing.

FIG. 6 is a functional block diagram illustrating a plurality of memory structures formed according to one embodiment of the present invention. A FIFO pointer block memory structure 604 includes a plurality of command block pointers 608, 612 and 616. Each command block pointer identifies a command block within a command block array 620. Thus, as may be seen, command block array 620 includes three data block pointers 624, 628 and 632 that each point to one of a plurality of data blocks stored within data memory 636. Thus, within data memory 636 there exists at least three memory portions 640, 644 and 648 that store data blocks 1, 2 and 3, respectively.

From examining FIG. 6, it may be seen that FIFO pointer block memory structure 604 includes the command block pointers that may be arranged in any order to point to one of a plurality of data block pointers stored within command block array 620. The FIFO priority is obtained by arranging the command block pointers within FIFO pointer block memory structure 604 to create the ordered priority. Given that the priority rule is first in, first out, the command block pointers within FIFO pointer block memory structure 604 are ordered in the order received.

Thus, the priority for the data blocks is achieved by ordering the command block pointers within FIFO pointer block memory structure 604. Because the command block pointers 608, 612 and 616 within FIFO pointer block memory structure 604 point to one of a plurality of data block pointers within command block array 620, wherein the data block pointers actually identify the starting address of a data block, a flexible structure is presented in which FIFO integrity or ordering may be achieved while minimizing the size of a FIFO memory structure.

To give a more specific example, command block pointer 608 of FIFO pointer block memory structure 604 includes a pointer to data block pointer 628 that is stored within command block array 620. Data block pointer 628, in turn, points to data block 3 within memory portion 648 of data memory 636. Command block pointer 612, however, points to data block pointer 632 which, in turn, points to data block 2 within memory portion 644. Finally, command block pointer 616 points to data block pointer 624 of command block array 620 which, in turn, points to data block 1 stored in memory portion 640 of data memory 636. As may be seen in the present example, data block 3, which is stored in a memory location that suggests, perhaps, third in time based on its relative placement, actually represents the highest priority data block for transmission purposes based upon the ordering of the command block pointer 608 that eventually corresponds to data block 3 stored in memory portion 648.

Figure 7:
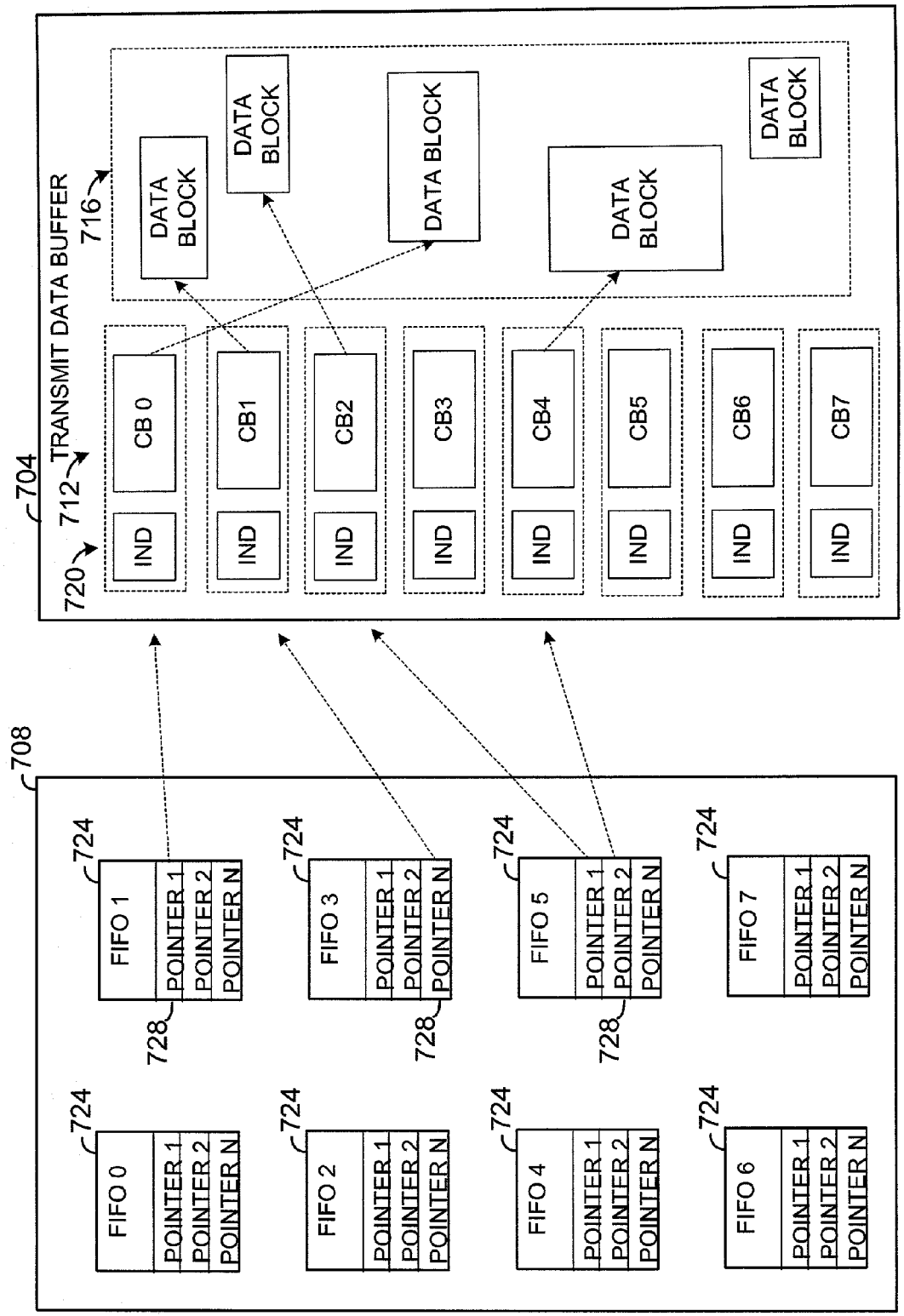
FIG. 7 is a functional block diagram illustrating one embodiment of memory structures formed and configured according to the present invention.

FIG. 7 is a functional block diagram illustrating one embodiment of memory structures formed and configured according to the present invention. A random access memory 704 is configured to include at least three portions. A FIFO structure 708 is formed to interact with the random access memory 704 to support the transmission of data blocks on a first in, first out basis. More specifically, random access memory 704 includes a command block portion 712 that is for storing command blocks. Each command block is four bytes long and includes an address that points to an actual data block that is to be transmitted. A data block portion 716 includes actual data blocks that are to be transmitted. In the figure shown, the data blocks are randomly distributed within the figure to suggest that the data blocks may be ordered in a random fashion. Each data block within data block portion 716 includes the data, which data may be of any size, as well as header information that defines, among other things, the amount of data that corresponds to the data block. An indicator portion 720 of random access memory 704 is for storing a plurality of indicators, each of which is one bit long in the described embodiment, that identify whether a corresponding command block is in use. For example, command block 0 of portion 712 will have a one-bit indicator in indicator portion 720 that identifies whether the command block is in use. In the described embodiment of the invention, "in use" refers to whether a transmission has been successfully completed for a corresponding data block stored in data block portion 716. Thus, once a data block has been successfully transmitted, the indicator for the corresponding data block is reset to indicate that the command block is no longer in use and that a new data block address may be inserted therein for a new data block that is being stored within data block portion 716.

Within FIFO structure 708, a plurality of FIFO pointer blocks 724 are used for specifying the order in which data blocks are to be transmitted. In the example shown, eight FIFO pointer blocks 724 are shown. Each FIFO pointer block 724 includes at least one-byte pointer 728. The at least one-byte pointer 728 is a one-byte long pointer that points to a corresponding command block that identifies an address of a data block that is to be transmitted. Thus, within each FIFO pointer block 724, a series of data blocks may be ordered in a first in, first out basis. Each of the FIFO pointer blocks 724 further corresponds to communications for a particular device, e.g., a slave device. Thus, the present architecture decouples the transmissions of the slaves relative to each other. Stated differently, traffic to all the slaves are independent and may be controlled independently of each other with the present architecture. Thus, for example, if the traffic for a first slave encounters an error, the traffic to any other slave is not affected as retransmissions occur for the first slave. Moreover, in the described embodiment of the invention, there are eight FIFO pointer blocks 724, as well as eight command blocks within command block 712 and eight indicators within indicator portion 720. The number of data blocks within data block portion 716, however, is not tied to the number of FIFO pointer blocks 724 and command blocks within command block portion 712. Rather, the number of data blocks within data block portion 716 is a function of the number of data blocks that are to be transmitted. As was indicated with reference to FIFO structure 708 and, more particularly, the FIFO pointer block 724, each FIFO pointer block 724 may have an indeterminate number of one-byte pointers to command blocks listed in a transmission order (FIFO).

As may be seen, the present configuration is advantageous in that is supports FIFO ordering of traffic to a plurality of slaves in a manner that avoids delays to a plurality of slaves based on transmission errors to one slaves, and in a manner that significantly reduces the cost associated with FIFO structures by minimizing the size of the FIFO structure. The particular configuration is advantageous for networks in which a master communicates with two or more slaves.

Figure 8:
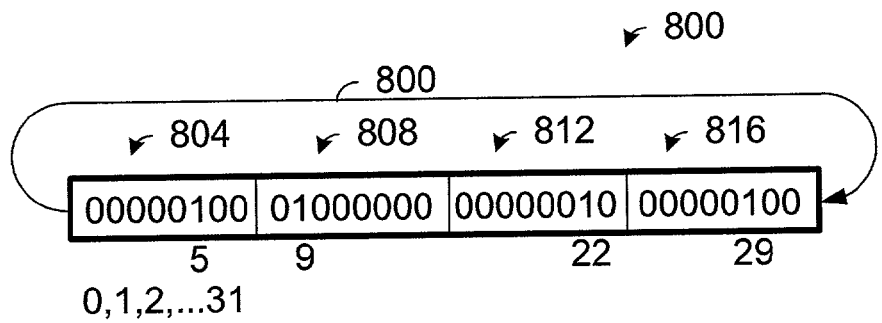
FIG. 8 is a functional block diagram that illustrates a system design that utilizes a string of bits to specify when synchronized communication events are scheduled to occur according to one embodiment of the present invention.

FIG. 8 is a functional block diagram that illustrates a system design that utilizes a string of bits to specify when synchronized communication events are scheduled to occur according to one embodiment of the present invention. As may be seen, a string of bits 800 is broken in to four eight-bit (or one-byte) blocks of bits. In total, there are 32 bits in the string of bits numbered 0 through 31. Each byte of bits defines the synchronization events that occur in a corresponding time period. Counting from left to right, it may be seen that in the byte shown generally at 804, bit 5 is the first bit representing a time period in which a synchronized communication is to occur. In the second byte 808, the ninth bit of the string of bits is the second bit that represents a synchronized communication transmission is to occur. The third bit reflecting a time period in which a synchronized communication is to occur is the $22^{nd}$ bit that is shown generally at 812. In the present example, the bit that represents a time period in which a synchronized transmission is to occur is bit 29 which is found in the byte shown generally at 816.

As may also be seen from viewing FIG. 8, a circular arrow 820 is used to represent that the pattern of synchronized transmissions is repeated continuously until the pattern is modified. Thus, after the time period represented by bit 31 of the string of bits 800 has elapsed, then the string repeats itself with the time period referenced by bit 0.

As is known by those skilled in the art, continuous bit rate communications generally include the transmission of certain types of data at a rate that is sufficiently fast enough to avoid unacceptable impact on the data. For example, when voice information is being transmitted in a serial digital string, delays beyond a certain amount affect the auditory quality of the reconstructed signal at the receiving end. Accordingly, there is a requirement that voice information be transmitted at a minimal frequency. Similarly, when sound is converted to a signal that is eventually digitized, the sample rate of a vocoder that converts the sound into a signal must be sufficiently high or above the minimum defined frequency that causes a degradation in quality. Thus, for the present example of FIG. 8, the synchronized events are those communication slots for which a communication is required in order to avoid a signal degradation that is unacceptable.

Figure 9:
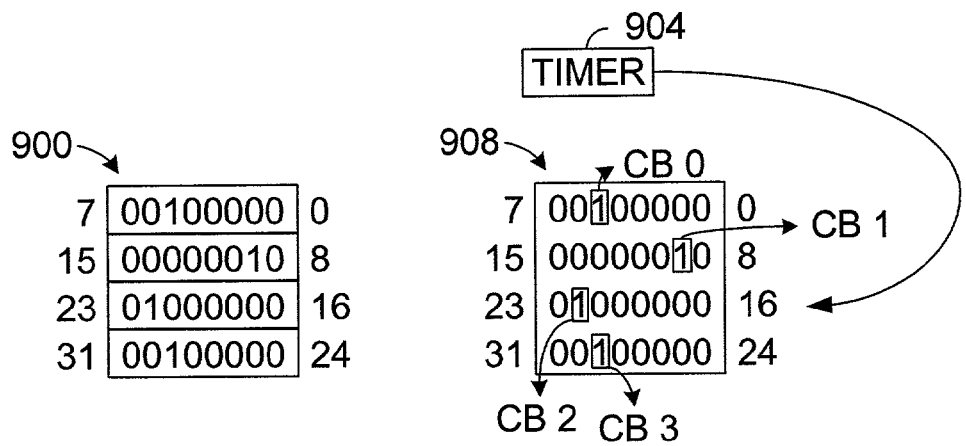
FIG. 9 illustrates a plurality of tables that further represent the operation of the present invention.

FIG. 9 illustrates a plurality of tables that further represent the operation of the present invention. More specifically, the string of bits referred to in FIG. 8 are also shown in the table shown generally at 900. The significant difference between table 900 and the strings of bits 800 is simply that the string of bits is arranged in a tabular form. Additionally, the counting of the bits commences on the right hand side of the table and progresses left, and from the top row to the bottom. Thus, bit 0 is in the upper right corner of the table and bit 31 is in the bottom left corner of the table.

One significant aspect of the example of FIG. 9 is that table 900 actually represents a user entry table in which a user specifies when the synchronized communication events are to occur. The table shown generally at 908, on the other hand, represents the actual table upon which a micro controller operates to determine whether a synchronized event is scheduled at a given period of time. Thus, a timer 904 is used to determine where to look within table 908 to determine the scheduling of a synchronized communication event. The actual algorithm shall be described below. In general, however, the timer value generated by timer 904 is used to determine the present time and thus which of the 32 bits reflects whether a synchronized event is scheduled for that time slot.

The table shown generally at 908 of FIG. 9 also illustrates another aspect of the present invention. Examining bit 5 of the top row of bits, an arrow extends from the block surrounding bit 5 which arrow points to the label "CB 0". Similarly, bit 9 points to the label "CB 1" while bit 21 points to the label "CB 2" and bit 29 points to the label "CB 3".

Figure 10:
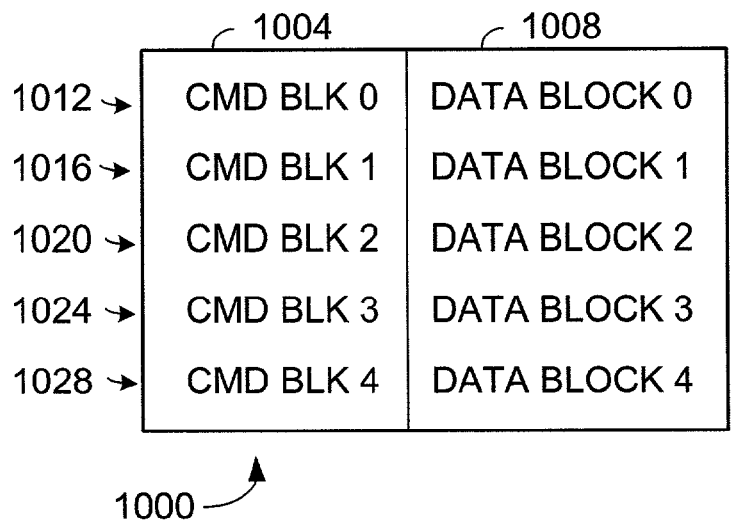
FIG. 10 is a table that illustrates one aspect of the operation of the present invention.

FIG. 10 is a table that illustrates one aspect of the operation of the present invention. As was shown in FIG. 9, each of the four synchronous events had an associated reference to a label "CB 0", "CB 1", "CB 2" or "CB 3". Each of those labels refers to what is illustrated in the table of FIG. 10. More specifically, "CB 0" refers to command block 0, as shown in column 1004, in the row shown generally at 1012. The column shown generally at 1008 identifies a particular data block that corresponds with the command block identified in column 1004. Thus, as is shown in row 1012, data block 0 corresponds to command block 0. Similarly, data block 1 corresponds to command block 1, as is shown in row 1016. Rows 1020, 1024 and 1028 also show the relationship between data blocks 2, 3 and 4 with respect to command blocks 2, 3 and 4. While only five rows are shown in the table of FIG. 10, it is understood that there is no limitation as to the number of rows. The table is limited to five rows, in the example shown, for the sake of simplicity.

Further, as has been explained earlier in this application, the command blocks include addresses that identify particular data blocks. Thus, examining an entry in column 1004, one would be able to determine what command block should be examined to obtain an address that relates to the corresponding data block. Thus, for one example, an address stored within command block 2, as shown on row 1020, would specify the beginning address of data block 2.

Referring back to FIG. 9, each of the digits in the 32-bit string of bits stored in table 908, as well as table 900 and string of bits 800, represents a time period in which a "synchronized" data transmission is to occur to maintain data quality. In the present example, the data blocks are transmitted in a sequential order. Thus, the very first bit that is encountered relates to the first command block that identifies the first data block that is to be transmitted. Thus, that is why bit 5 identifies that the data specified by command block 0 is to be transmitted during that time period. Moreover, while the example lists the command block numbers in a sequential order, it is understood that any priority scheme may be used. In general, the sequential order reflects the transmission priority.

Figure 11:
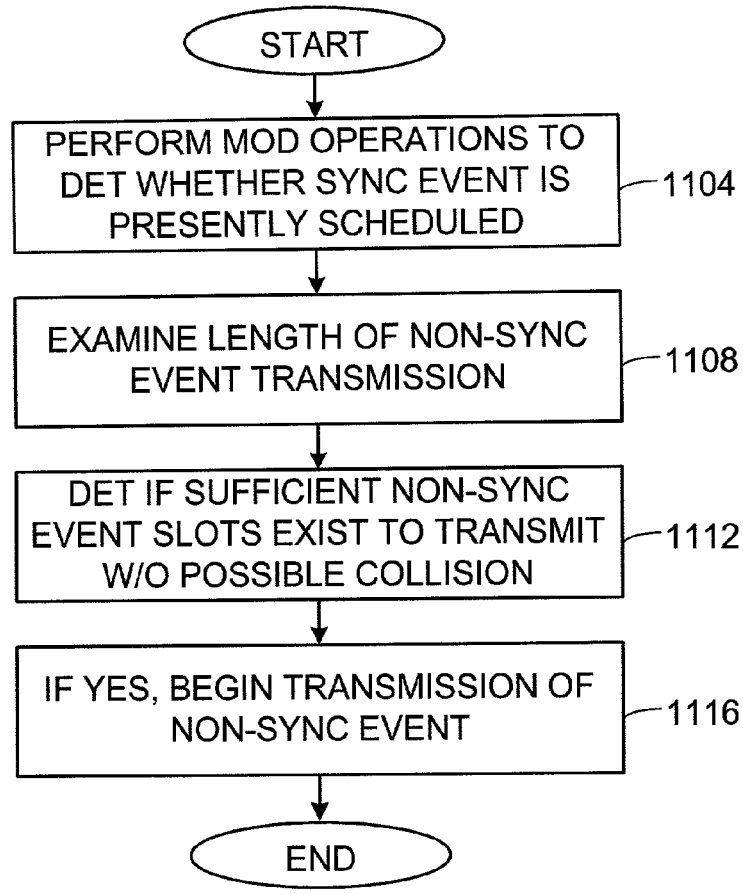
FIG. 11 is a flowchart that illustrates a method for determining when to transmit non-synchronized data according to one embodiment of the present invention.

FIG. 11 is a flowchart that illustrates a method for determining when to transmit non-synchronized data according to one embodiment of the present invention. Referring now to FIG. 11, as well as to FIGS. 8 and 9, the first step is to perform modulo operations (MOD) to determine whether a synchronized event is presently scheduled (step 1104). In general, this includes determining which slot applies to the present time period. For example, as is shown in FIG. 8, the string of bits is continuously repeated over time. Thus, at any given instant in time, one must determine where the string of bits is relative to the present. One way to do this is to perform a modulo operation, for example, based on the number 32 since there are 32 bits in the string of bits of FIGS. 8, 9 and 10. While step 1104 describes the embodiment of the present invention where a modulo operation is performed to determine the present bit relative to the present time, it is understood that other schemes may readily be substituted for that described in step 1104.

As previously explained, one aspect of the present invention is tracking when the synchronization of events occur relative to the present time. Thus, once it is determined in step 1104 which of the 32 bits of the string of bits 800 applies to the present time, the next step is to then determine whether a non-synchronized bit of data may be initiated without causing a conflict. For example, if the present time is that identified by bit 6 in block 804 of FIG. 8, then the transmission of non-synchronized data may occur so long as the duration of the data will not exceed the length of time represented by three bits, namely, bits 6, 7 and 8. The reason for this, of course, is that a longer transmission would potentially cause a collision with synchronized data that is to be transmitted within the time period identified by bit 9 of FIG. 8. Thus, for example, if the amount of non-synchronized data that is to be transmitted exceeds the presently available time, the transmission of such data must wait until the time slot is available. According to the example of FIG. 8, this would mean that the data transmission whose transmission length equals or exceeds four bits would not necessarily have to wait until the time period identified by bit 10 begins.

Thus, having illustrated the general process of FIG. 8, the steps of the present invention include, as has been described, examining the length of the non-synchronized event transmission (step 1108), and then determining if there is sufficient non-synchronized event slots to enable the transmission of the non-synchronized event without risking collision with a synchronized event (step 1112). If such a period does exist starting with the present time to facilitate such a transmission, then the transmission of the non-synchronized event begins (step 1116).

Figure 12:
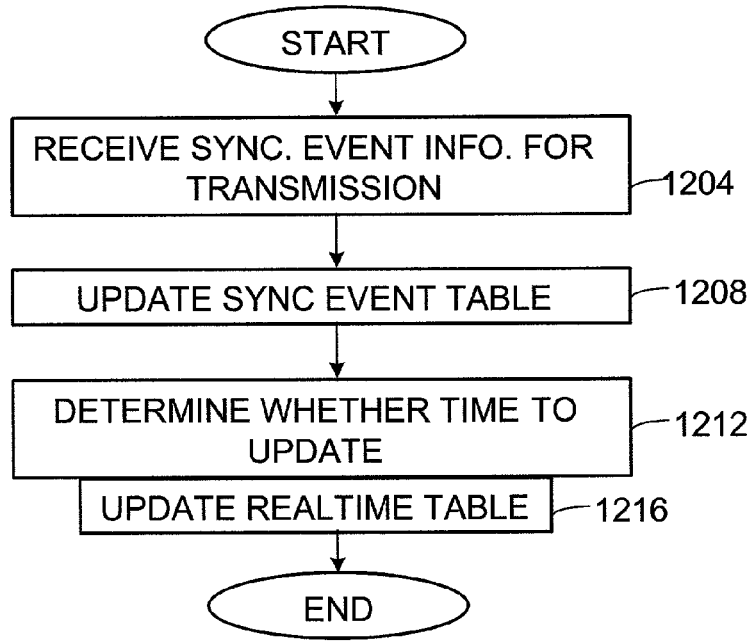
FIG. 12 is a flowchart that illustrates one aspect of the present invention, namely, that of creating a real-time table that identifies when synchronized events are to occur relative to the present.

FIG. 12 is a flowchart that illustrates one aspect of the present invention, namely, that of creating a real-time table that identifies when synchronized events are to occur relative to the present. The method of FIG. 10 also may be more readily understood by viewing the tables of FIG. 9. Table 900, of FIG. 9, represented user-defined synchronization events. Table 908, on the other hand, represents the table upon which a microsequencer or micro controller operates to determine whether a synchronized event is to occur at the present time and, as has been described before, whether a non-synchronized event may be initiated at the present time without risking subsequent collision with a synchronized event.

Thus, one step in the process is for a microsequencer or other device to receive synchronized event information for transmission (step 1204). The synchronized event is received and stored in tabular form as shown in table 900 of FIG. 9. Thus, while a microsequencer or other micro controller operates upon the table 908, new events may be defined and stored in table 900. Thus, the event includes not only receiving synchronized event information of step 1204, but also updating the user-defined synchronized event table 900 (step 1208).

Once a table has been updated, a determination is made as to whether it is time to update the real-time table with the user table 900. Alternatively, the table may be updated periodically, if necessary, at defined intervals. Generally, the present invention includes, in the described embodiment and at specified times, copying the entered user table into the real-time table for operation. Thus, the next step of the invention includes determining whether it is time to update the real-time table with the user table (step 1212) and, if so, updating the real-time table by either changing the updated values therein or replacing the table in its entirety (step 1216). Of course, other methods for updating the real-time table may be easily substituted for these described herein. One aspect of the present invention, however, is the utilization of two tables for tracking the transmission of synchronized events and for determining whether non-synchronized events may be initiated.

Figure 13:
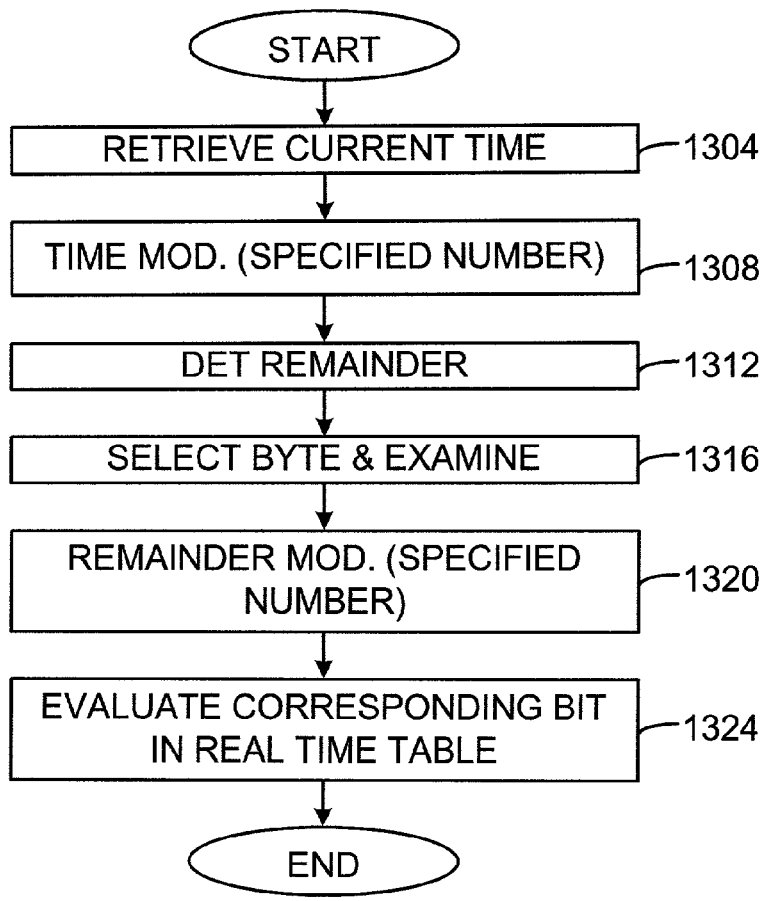
FIG. 13 is a flowchart that illustrates one method of determining which bit in a bit stream (STRING?) represents the present time according to one aspect of the present invention.

FIG. 13 is a flowchart that illustrates one method of determining which bit in a string of bits represents the present time according to one aspect of the present invention. The first step in the method is to retrieve the current time from a time source whether it is an internal time source or an external time source (step 1304). Thereafter, the time factor is divided by a specified (or modulo) number. A modulo number is one that reflects the number of frames, packets or bits that are to be counted before a counter is reset to 0 to repeat the process. Generally, a modulo number relates to the number of frames, packets or bits that are outstanding before a process is repeated. Thus, in the present example, since the bit string is 32 bits long, a proper modulo number for the inventive process is 32. Accordingly, the retrieved time value from step 1304 is divided by the modulo number of 32 (step 1308). As such, the remainder reflects which bit identifies the present time. Thus, once the division occurs, the remainder is determined (step 1312). The remainder value is then divided by modulo 8 since, as is shown in FIG. 9, a string of bits are stored in a table having four rows, with each row having eight bits. Thus, by taking the remainder from step 1308 and dividing it by modulo eight, the selected byte within which the bit exists for the present time may be determined. Accordingly, the invention includes retrieving that byte of bits for further examination (step 13126. The remainder value that was previously determined in step 1312 then is also divided by the modulo eight to determine a second remainder (step 1320). This second remainder identifies the specific bit within the byte determined in step 1316 that corresponds to the present time. Thus, the corresponding bit is evaluated in the real-time table to determine if a synchronization event is specified for that time (step 1324). This same bit that has been determined herein then, is also used to count the number of subsequent spaces in which a non-synchronization event is defined or, more accurately, for which a synchronization event is not defined, to determine whether a non-synchronization event may be initiated.

Figure 14:
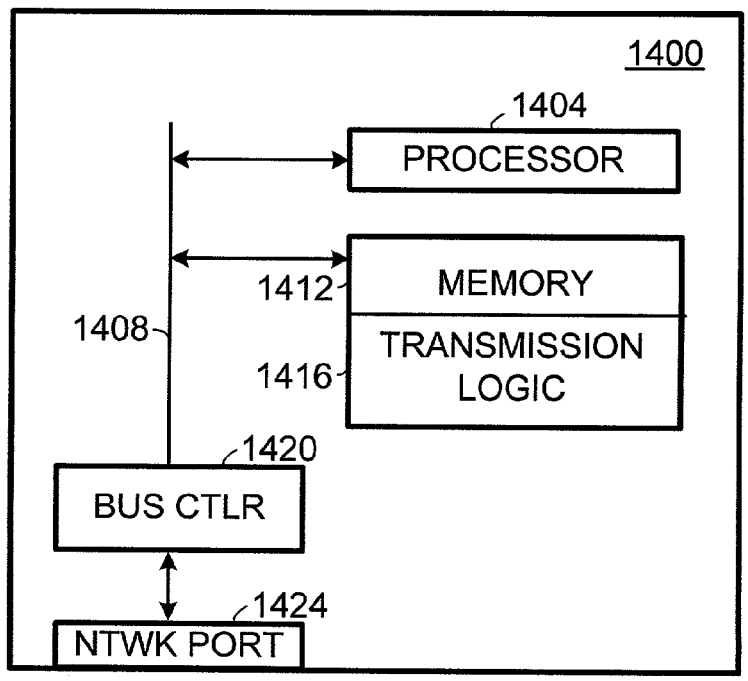
FIG. 14 is a functional block diagram that illustrates a microsequencer or microcontroller that monitors and determines whether a non-synchronization event may be initiated according to one embodiment of the present invention.

FIG. 14 is a functional block diagram that illustrates a microsequencer or microcontroller that monitors and determines whether a non-synchronization event may be initiated according to one embodiment of the present invention. Referring now to FIG. 14, a microsequencer 1400 includes a processor 1404 that is coupled to communicate over a bus 1408. A memory 1412 also is coupled to communicate with bus 1408. Memory 1412 includes computer instructions that define the operational logic of the micro controller 1400. The computer instructions further include logic for determining whether a non-synchronization event may be initiated, which instructions are shown generally at 1416.

Bus 1408 further is coupled to bus controller 1420 that, in turn, is coupled to network port 1424. Bus controller 1420 controls the timing and synchronization of communications on bus 1408 between processor 1404 and memory 1412. In conjunction with the bus controller 1420, processor 1404 retrieves computer instructions from memory 1412, including the computer instructions stored in memory at 1416, and executes the computer instructions to operate in a manner consistent by the logic defined by the computer instructions. Thus, the methods described herein and the associated logic for those methods are defined by the computer instructions stored within memory 1412 at 1416. Processor 1404 further communicates with external devices through port 1424.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. For example, while much of the present disclosure herein relates to Bluetooth networks, it is understood that the invention herein may be practiced readily in other environments as well. For example, any network including but not limited to master and multi-slave networks in which time sensitive and time independent transmissions occur wherein the time sensitive transmissions may be allocated specified resources or time slots may be modified to practice the present invention. For example, the present invention may also be practiced in of the future networks that replace or compete with current Bluetooth networks. As may be seen, the described embodiments may be modified in many different ways without departing from the scope or teachings of the invention.

The invention claimed is:

1. A method for transmitting non-synchronous events, comprising:
    building a fixed length user bit stream that reflects when synchronized events are to be transmitted;
    copying the fixed length user bit stream into a real time bit stream;
    determining what bit of the real time bit stream relates to a present time; and
    determining whether to initiate transmission of a non-synchronous communication event based upon the bit of the real time bit stream determined to relate to the present time.

2. The method of claim 1 further including copying the fixed length user bit stream into the real time bit stream on a periodic basis.

3. The method of claim 1 further including performing a mathematical operation as a part of determining what bit of the real time bit stream relates to the present time.

4. The method of claim 1 further including performing a mathematical operation to determine a group of bits of the real time bit stream that include what bit relates to the present time.

5. The method of claim 1 including dividing the present time by a modulo number as a part of determining what bit in the real time bit stream relates to the present time.

6. The method of claim 5 wherein the modulo number is equal to the number of bits in the fixed length user and the real time bit streams.

7. The method of claim 5 wherein the modulo number is equal to number "8".

8. The method of claim 5 wherein a remainder determined during the dividing step identifies the specific bit of the real time bit stream that represents the present time.

9. A wireless transceiver device, comprising:
memory for storing synchronous and non-synchronous events; and
circuitry defining logic that includes:
building a fixed length user bit stream that reflects when synchronized events are to be transmitted;
copying the fixed length user bit stream into a real time bit stream;
determining what bit of the real time bit stream relates to a present time; and
determining whether to initiate transmission of a non-synchronous communication event based upon the bit of the real time bit stream determined to relate to the present time.

10. The wireless transceiver device of claim 9 wherein the logic further includes copying the fixed length user bit stream into the real time bit stream on a periodic basis.

11. The wireless transceiver device of claim 9 wherein the logic further includes performing a mathematical operation as a part of determining what bit of the real time bit stream relates to the present time.

12. The wireless transceiver device of claim 9 wherein the logic further includes performing a mathematical operation to determine a group of bits of the real time bit stream that include what bit relates to the present time.

13. The wireless transceiver device of claim 9 wherein the logic further includes dividing the present time by a modulo number as a part of determining what bit in the real time bit stream relates to the present time.

14. The wireless transceiver device of claim 13 wherein the modulo number is equal to the number of bits in the fixed length user and the real time bit streams.

15. The wireless transceiver device of claim 13 wherein the modulo number is equal to number "8".

16. The wireless transceiver device of claim 13 wherein a remainder determined during the dividing step identifies the specific bit of the real time bit stream that represents the present time.

* * * * *